(12) United States Patent
Saitoh

(10) Patent No.: US 6,908,407 B2
(45) Date of Patent: Jun. 21, 2005

(54) SILENT CHAIN TRANSMISSION MECHANISM

(75) Inventor: Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 237 days.

(21) Appl. No.: 10/304,263

(22) Filed: Nov. 26, 2002

(65) Prior Publication Data

US 2003/0119614 A1 Jun. 26, 2003

(30) Foreign Application Priority Data

Dec. 20, 2001 (JP) ........................................ 2001-388291

(51) Int. Cl.$^7$ .................................................. F16H 7/06
(52) U.S. Cl. ...................................... 474/212; 474/201
(58) Field of Search ................................ 474/206, 212, 474/216, 213

(56) References Cited

U.S. PATENT DOCUMENTS 4,832,668 A * 5/1989 Ledvina et al. ............. 474/155
4,915,675 A * 4/1990 Avramidis ................... 474/213
5,588,926 A * 12/1996 Mott et al. ................... 474/212

FOREIGN PATENT DOCUMENTS

JP 10-30685 2/1998

* cited by examiner

Primary Examiner—David A. Bucci
Assistant Examiner—Vicky A. Johnson
(74) Attorney, Agent, or Firm—Howson and Howson

(57) ABSTRACT

A silent chain transmission mechanism includes a sprocket and a silent chain having link interleaved link rows each composed of plural randomly selected link plates and connected together by connecting pins. The outside dimensions of the link plate are smaller than the outside dimensions of a link, but the outside dimensions of the link match the design reference dimensions of a link plate capable of proper meshing with the sprocket. The requirement for manufacturing accuracy and the effort required for assembly of the silent chain are reduced. However, the silent chain travels on the sprocket on the chain traveling line so that improved noise, vibration and friction properties, and traveling stability are realized.

1 Claim, 6 Drawing Sheets

A>B, C<D

A>B, C<D

A>B, C<D

A>B, C<D

A>B, C<D

A=B, C=D

SILENT CHAIN TRANSMISSION MECHANISM

FIELD OF THE INVENTION

This invention relates to a transmission mechanism, which transmits power between a silent chain and a sprocket, and more specifically to a silent chain transmission mechanism of the kind suitable for driving a camshaft and a balancer shaft from the crankshaft of a four-cycle engine.

BACKGROUND OF THE INVENTION

A silent chain transmission mechanism, used to operate intake and exhaust valves, as well as a balancer or other mechanism, from the crankshaft of a four-cycle engine is shown in FIG. 4. The transmission includes a valve timing transmission mechanism M1 comprising a valve-driving crankshaft sprocket A11a, a camshaft sprocket A12a for the intake valves, a camshaft sprocket A12b for the exhaust valves, an endless, valve timing, silent chain 20a, in engagement with the sprockets, and a tensioner 30a, which maintains tension in the chain 20a. The transmission also includes a balancer transmission mechanism M2, comprising a balancer driving crankshaft sprocket A11b concentrically supported on the crankshaft with the valve-driving crankshaft sprocket A11a, a balancer shaft sprocket A13, an endless balancer driving silent chain 20b in engagement with sprockets A11b and A13, and a tensioner 30b, which maintains tension in chain 20b.

The valve timing silent chain 20a and the balancer driving silent chain 20b, are both made up of interleaved link rows, each composed of a plurality of link plates arranged in parallel relationship to one another. Each link plate is formed by punching, and has a pair of teeth for meshing with the sprockets. The link plates in each row are gathered at random, and the rows are connected to one another by connecting pins.

When the valve-driving crankshaft sprocket A11a rotates through two revolutions, the intake valve camshaft and the exhaust valve camshaft each rotate through one revolution. Thus, a two to one speed reduction is required, and accordingly, the number of teeth on each of the camshaft sprockets A12a and A12b is twice the number of teeth of the valve-driving crankshaft sprocket A11a.

When the crankshaft is rotates through one revolution, the balancer shaft rotates through two revolutions to compensate for the high degree of unbalance in the crankshaft. Thus, the rotational speed of the balancer shaft sprocket A13 must be twice that of the balancer driving crankshaft sprocket A11b, and accordingly, the number of teeth on the balancer driving crankshaft sprocket A11b must be twice the number of teeth on the balancer shaft sprocket A13.

Involute teeth, formed on the valve driving crankshaft sprocket A11a, the camshaft sprocket A12, and the balancer shaft sprocket A13 are all produced under the same tooth cutting conditions, by a hub cutter having a hob pitch which is the same as the chain pitch of the above-mentioned silent chains.

As shown in FIG. 5(a), even when the link plates in the valve timing chain 20a and the balancer driving chain 20b are punched accurately, slight shifts are generated in the positions of the connecting pin holes due to vibration during the punching operation. The positions of the pin holes in the link plate are not always symmetrical. Thus, the distance A between the one of the holes and the adjacent outer flank is different from the distance B between the other hole and the other outer flank. Similarly, the distance C between the center of one of the pin holes and a centerline is different from the distance D between the center of the other pin hole and the centerline. In other words, the relationships A=B, and C=D, as depicted in FIG. 5(c) are not always achieved. For example, the shift in the positions of the pin holes may be such that A>B and C<D, as shown in FIG. 5(a). When a large number of randomly selected link plates 21 are gathered in parallel in the direction of the chain width to form a link row during assembly of the chain, the outside dimensions, W and H, of the link rows, which are projections of all the parallel link plates in a widthwise row, are liable to be slightly larger than the outside dimensions, w and h, of an individual link plate, as shown in FIG. 5(b).

Accordingly, meshing failure can occur even where the chain is engaged with a sprocket designed for optimum engagement and produced using a hob cutter having a hob pitch the same as the chain pitch measured between a pair of pin holes punched in the link plates of the chain. Meshing failure may occur due to tight engagement between the sprocket and the link plates, as a result of the differences, δw and δh, between the outside dimensions W and H of a link row and the outside dimensions, w and h of an individual link plate, as shown in FIG. 5(b). The differences between the dimensions W and H on the one hand, and the dimensions w and h on the other, leads to problems of noise and vibration in the chain, and also to meshing interference at the meshing surfaces. Thus, the dimensional differences decrease the resistance of the silent chain to wear.

Furthermore, in a conventional silent chain transmission mechanism as shown in FIG. 4, all involute teeth of the various sprockets are produced using hob-cutters having the same hob pitch, even though the sprockets, except for the two camshaft sprockets, have different numbers of teeth. It is very difficult to attain optimum meshing between the chain and these sprockets across the board, and impossible to avoid meshing failure, which can occur at any one of the sprockets. Meshing failure leads to a further increase in vibration noise and wear.

Each of the camshaft sprockets A12a and A12b has a number of teeth greater than the number of teeth on the valve-driving crankshaft sprocket A11A, and the number of links engaged with each of these camshaft sprockets is larger than the number of links engaged with the valve driving crankshaft sprocket. The balancer driving crankshaft sprocket A11b has a larger take-up angle than the balancer shaft sprocket A13. In each case, the above-mentioned tight meshing engagement causes at least a part of the chain to travel outside the design chain traveling line, that is, the arc on which the pitch line of the silent chain should travel when properly seated on a sprocket, so that the angular pitch of the chain is equal to the angular pitch of the sprocket. This leads to problems that affect noise properties, vibration properties, friction properties, traveling stability and the like.

Accordingly objects of the invention are to overcome the above-mentioned problems of the prior art, and to provide a silent chain transmission mechanism which allows for. easier assembly of the chain and a reduced requirement for manufacturing accuracy, but in which the silent chain travels in a regular manner over sprockets, on the design chain traveling line, without dislodging. It is also an object of the invention to achieve improved noise, vibration, and friction properties, and travel stability.

SUMMARY OF THE INVENTION

The silent chain transmission mechanism in accordance with the invention comprises a silent chain and a sprocket.

The silent chain is composed of interleaved link rows connected to one another by connecting pins, each link row being composed of plural, toothed, link plates arranged in side-by-side, parallel, relationship. The silent chain is in meshing relationship with the sprocket, and outside meshing surfaces of link rows along a portion of the chain are in seated relationship with teeth of the sprocket. Each link plate has a pair of pin-receiving holes for receiving connecting pins, a pair of teeth having straight, converging, outer flanks, a maximum length w, measured in the direction of the length of the chain, and a height h equal to the distance from a pitch line intersecting the centers of said pin-receiving holes to a point at which imaginary extension lines aligned with the outer flanks intersect. Each link row has a length W equal to the maximum length of a lateral projection of the link row, and a height H equal to the distance from a pitch line intersecting the centers of the pin-receiving holes of the link plates of the link row to a point at which imaginary extension lines aligned with the foremost and rearmost flanks of the link plates in said link row intersect. The link plates of each of link row are gathered at random. The distances from the centers of the pin-receiving holes to the adjacent flanks of a link plate in each row differ from the corresponding distances in a least one other link plate in the same row, and the distances from the centers of the pin-receiving holes to a midline located midway along the length of a link plate in each row differ from the corresponding distances in at least one other link plate in the same row. Consequently the length W and height H of each link row exceed the length w and height h, respectively, of each of the individual link plates in the same link row. Design reference dimensions Ws and Hs, used with reference to a sprocket, are the outside reference dimensions of an ideal link plate such that the meshing surfaces of a chain composed of such ideal link plates finally mesh with, and become seated on, the sprocket teeth during power-transmitting operation of the silent chain with the chain pitch line coinciding with the traveling line. In the chain in accordance with the invention, the length W and the height H of each link row respectively match the design reference length Ws and design reference height Hs for the sprocket, for proper meshing of the chain with the sprocket. Consequently, the chain can properly mesh with the sprocket even when the link plates in each link row are not matched with one another, and even if the link plates in each link row are asymmetric with respect to a center line extending along the longitudinal direction of the chain.

In the silent chain transmission mechanism of the invention the outside meshing surfaces of the link rows become seated on the sprocket during power transmission. However, the outside or inside meshing surfaces of a link row may mesh with the sprocket teeth at the starting point of meshing.

In the silent chain used in the silent chain transmission mechanism of the invention, the outside dimensions w and h of a link plate, punched using a pair of connecting pin holes as a reference, are smaller than the outside dimensions W and H of a link composed of the plural link plates. The outside dimensions W and H of the link match the design reference dimensions Ws and Hs for the chain and sprocket. Thus, even though the link plates of a given link are gathered at random, the silent chain travels regularly on the chain traveling line of the sprocket and meshes reliably with the sprocket teeth.

DETAILED DESCRIPTION OF THE PREFERRED EMBODIMENTS

A preferred embodiment of a silent chain transmission mechanism according to the invention will be described below with reference to the drawings.

Figure 4:
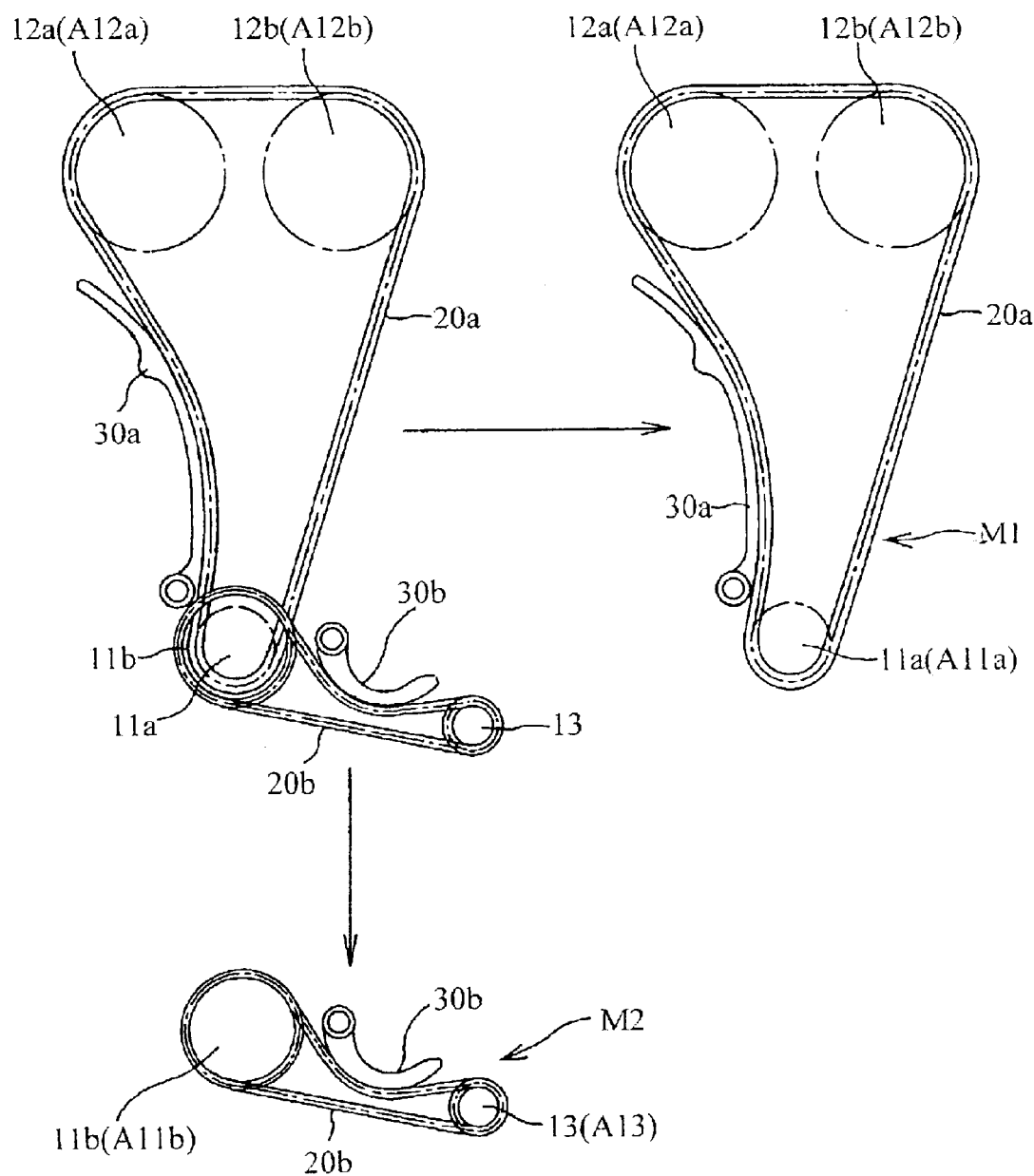
FIG. 4 is a schematic view of a silent chain transmission mechanism, also showing the camshaft drive portion and the balancer drive portion separately.
Figure 5A:
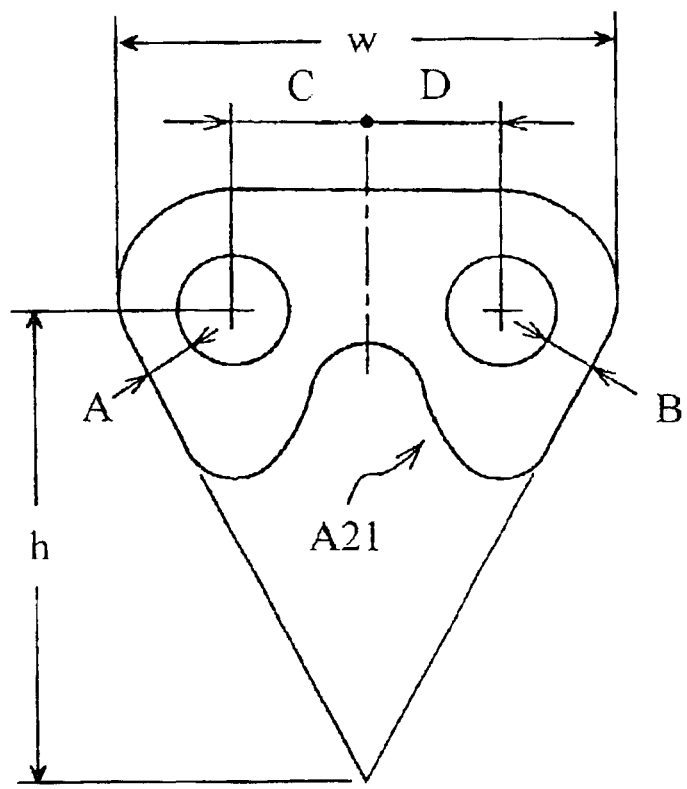
FIGS. 5(a), 5(b) and 5(c) are enlarged elevational views showing magnitude relations between the outside dimensions of a link plate, and the outside dimensions of a link in a conventional silent chain.
Figure 5B:
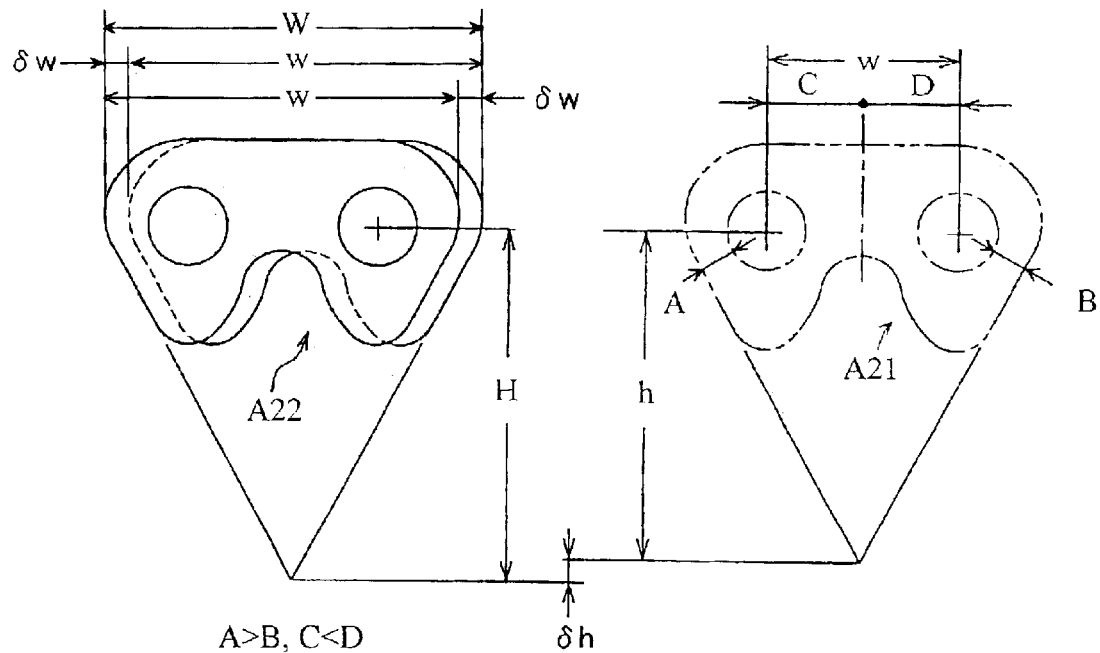
Figure 5C:
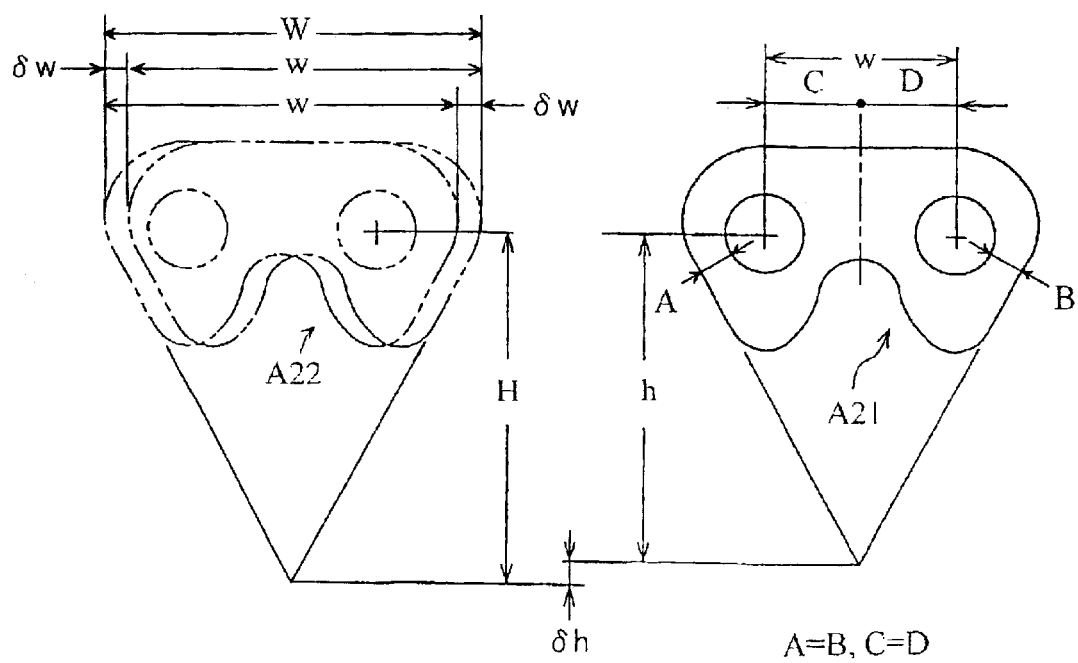

The configuration of the silent chain transmission mechanism in accordance with the invention, when incorporated into a four-cycle engine, is essentially the same as that of the silent chain transmission mechanism shown in FIG. 4. It comprises a valve timing transmission mechanism M1, which transmits power from a valve driving crankshaft sprocket 11a, through valve driving timing silent chain 20a, to an intake valve camshaft sprocket 12a and an exhaust valve camshaft 12b, in order to rotate the intake valve and exhaust valve camshafts once for every two rotations of the crankshaft. The silent chain transmission mechanism also includes a balancer transmission mechanism M2, which transmits power from a balancer driving crankshaft sprocket 11b, through a balancer driving silent chain 20b, to a balancer shaft sprocket, which rotates twice for each rotation of the crankshaft. Although only one balancer shaft sprocket is shown, in practice, there may be two balancer shaft sprockets.

Figure 3A:
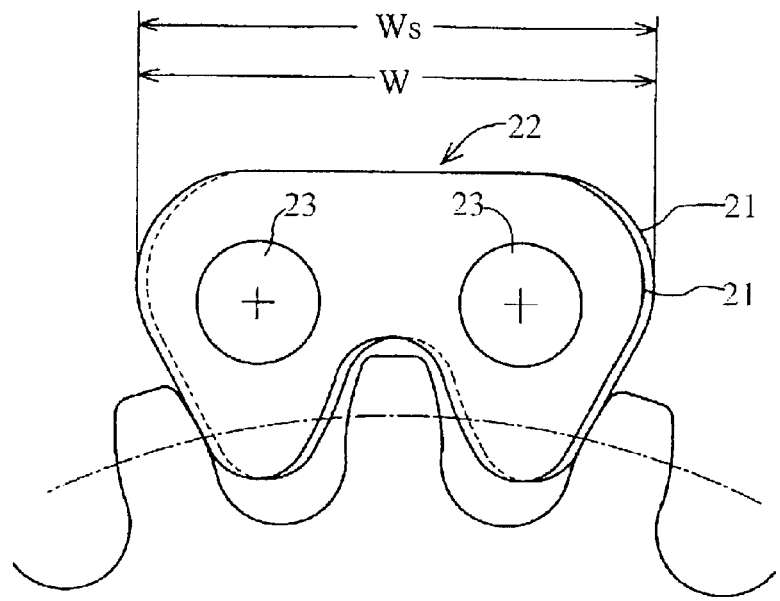
FIGS. 3(a) and 3(b) are enlarged schematic views illustrating the meshing of a chain with a sprocket respectively in FIGS. 2(a) and 2(b)

The valve timing silent chain 20a and the balancer driving silent chain 20b are respectively formed by connecting a number of link rows 22 to one another in an interleaved manner, using connecting pins 23 as shown in FIG. 3(a). Each link row is formed of a plurality of link plates 21, each having a pair of meshing teeth. The respective silent chains 20a and 20b are assembled in the same shape and structure in the longitudinal direction of the chain. At the start of meshing of the chain with a sprocket, inside meshing surfaces in the link rows 22 mesh with the sprocket teeth, and ultimately the outside meshing surfaces mesh with and become seated on the sprocket teeth.

Figure 1A:
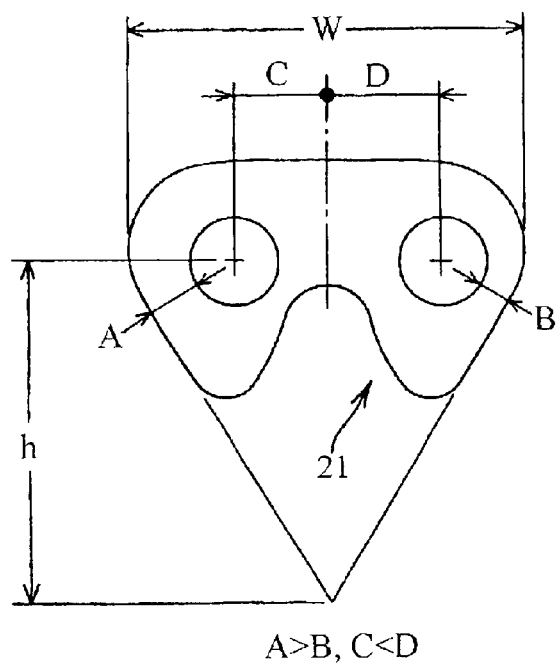
FIGS. 1(a) and 1(b) are enlarged views respectively of a link plate and a link row of a silent chain in accordance with the invention, showing magnitude relations between the outside dimensions of the plate, the outside dimensions of the link, and design reference dimensions.
Figure 1B:
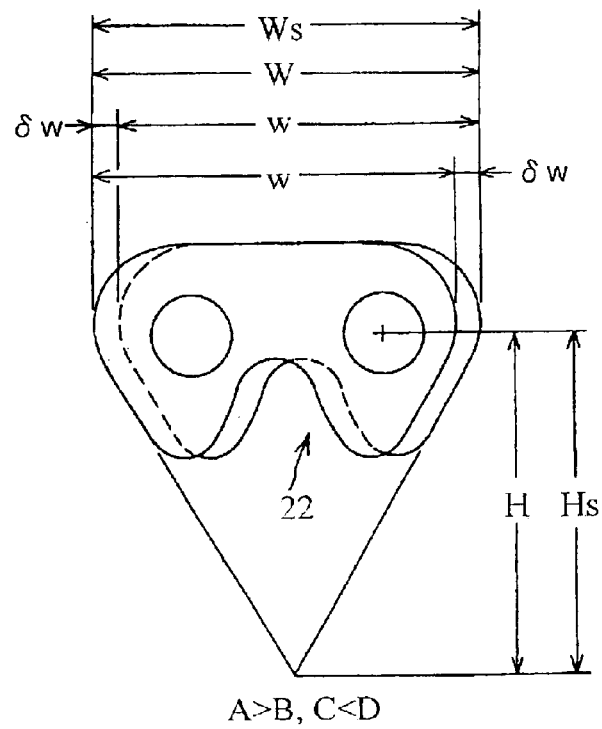

The individual link plates 21, are accurately punched out of a blank steel sheet by a shaving process or a fine blanking process, using a pair of connecting pin holes as the reference positions, and a link row 22 is composed of the thus punched link plates 21 by gathering a plurality of link plates 21 at random, and positioning them in parallel relation to one another as shown in FIG. 1(b).

In each link plate 21 a slight shift occurs between the reference positions of the pin holes and the periphery of the plate due to vibration or shock in the punching operation.

Therefore, the plate becomes asymmetric in the longitudinal direction. That is, the distances A and B between the peripheries of the pin-receiving holes and the adjacent outer tooth flanks become different as do the distances C and D between the centers of the holes and a midline. In the example illustrated in FIG. 1(a), A>B and C<D. As shown in FIG. 1(b), because these shifts vary from one link plate to another, the outside dimensions, w and h, of the link plates are smaller than the outside dimensions, W and H, of a link composed of link plates selected at random, the dimensions W and H being the dimensions of a profile of the link. Thus, w <W, and h <H.

Figure 2A:
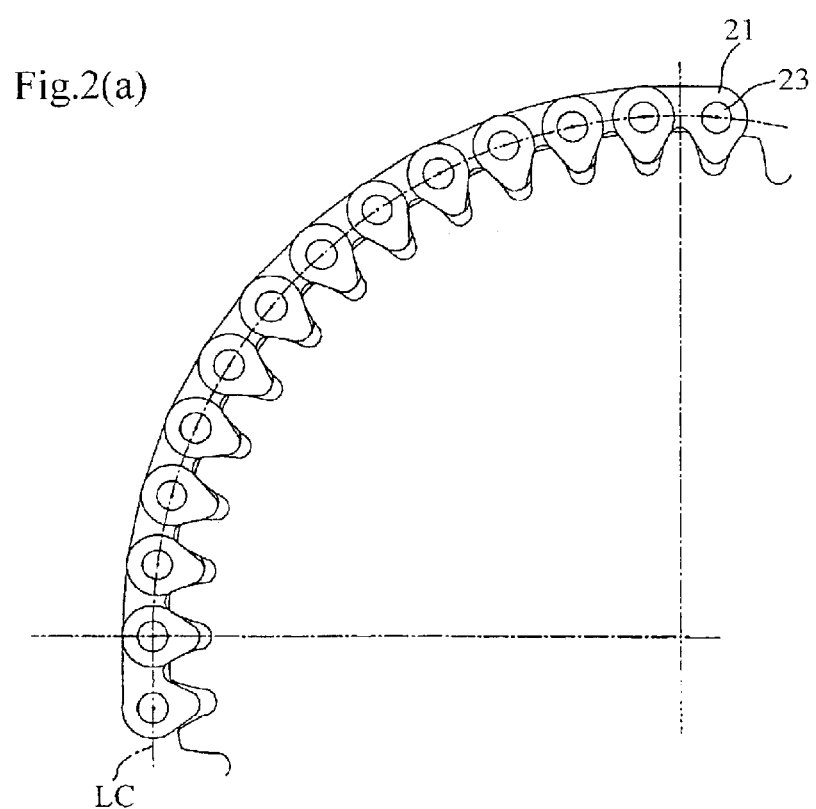
FIGS. 2(a) and 2(b) are fragmentary elevational views of a portion of a silent chain transmission mechanism, FIG. 2(a) showing the manner in which a silent chain meshes with a sprocket in a transmission mechanism in accordance with the invention, and FIG. 2(b) showing the manner in which a silent chain meshes with a sprocket in a conventional transmission mechanism.

The outside dimensions, W and H of the link match the design reference dimension Ws and Hs, for proper meshing with a sprocket such as the valve driving crankshaft sprocket 11a, the intake valve-camshaft sprocket 12a, or the exhaust valve-camshaft sprocket 12b. That is, the outside reference dimensions, Ws and Hs of the links of the silent chain, are set so that Ws=W and Hs=H, so that the link plates finally mesh with and seat on sprocket teeth, on the traveling line Lc of the chain, during power-transmitting operation, as shown in FIG. 2(a).

Involute teeth of the sprockets are produced under the same tooth cutting conditions. That is, involute teeth of the crankshaft sprockets, the camshaft sprockets, and the balancer shaft sprockets, are cut by a hob cutter having the same hob pitch as the chain pitch of the silent chain.

Both the valve timing chain 20a and the balancer driving chain 20b are formed so that the outside dimensions w and h of the link plates 21 are smaller, respectively, than the outside dimensions W and H of the links, and the outside dimensions W and H of the links match the design reference dimensions Ws and Hs respectively, for properly meshing with a sprocket. That is, W=Ws, and H=Hs. Thus, as shown in FIG. 2(a), the silent chain according to the invention travels on the chain traveling line Lc on a sprocket such as the crankshaft sprocket 11a, or camshaft sprocket 12a, and reliably meshes with sprocket teeth as shown in FIG. 3(a).

Figure 2B:
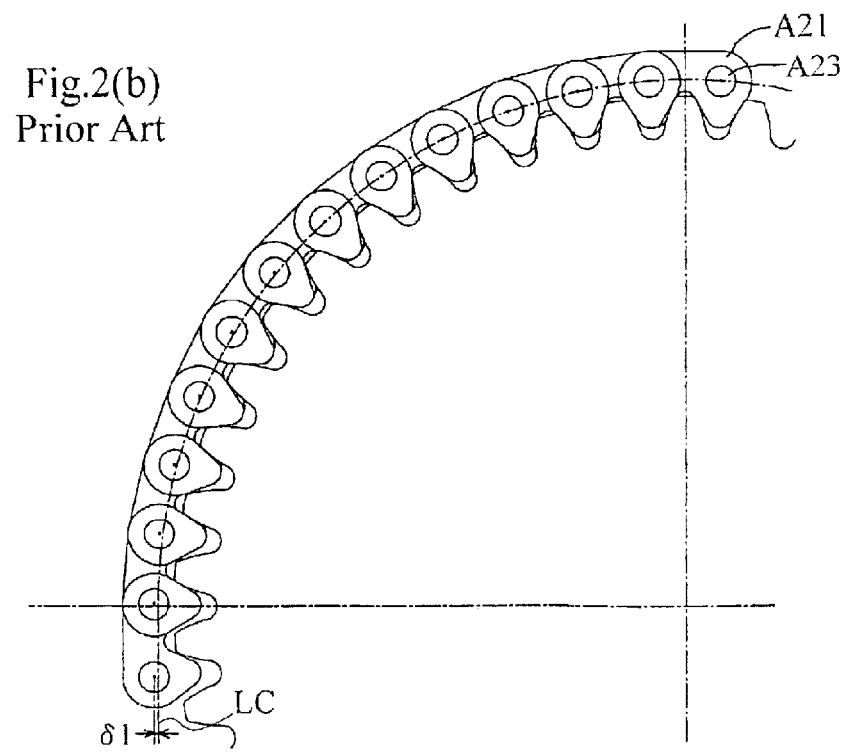
Figure 3B:
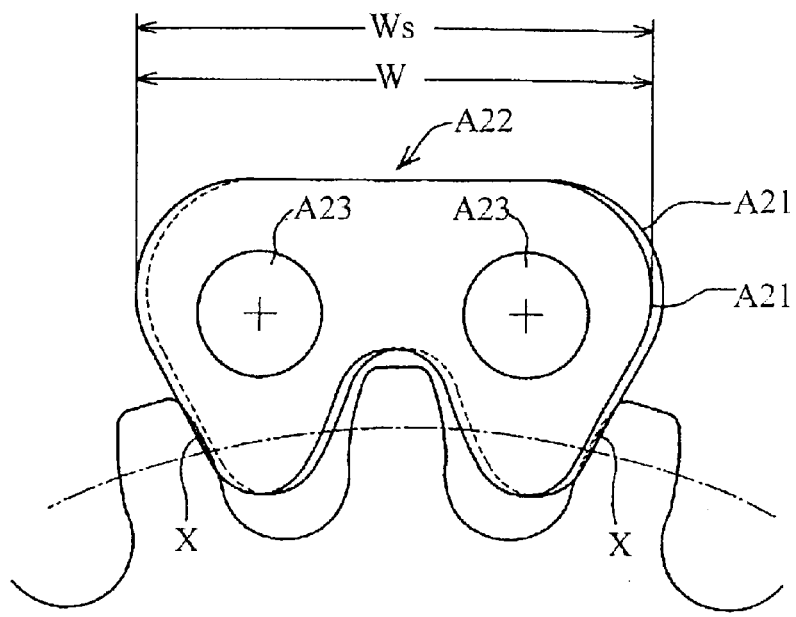

Each of the camshaft sprockets has a larger number of teeth than the valve-driving crankshaft sprocket, and larger number of links is engaged with each camshaft sprocket than with the valve-driving crankshaft sprocket. The balancer driving crankshaft sprocket has a large take-up angle. However, in each case, involute teeth are produced under the same tooth cutting conditions, that is, involute teeth are cut by a hob cutter having the same hob pitch as the chain pitch of the above-mentioned silent chain. Moreover, the outside dimensions, W and H of the links matches the design reference dimension Ws and Hs, for properly meshing with a sprocket. The conventional chain, as shown in FIG. 2(b), travels outside the design chain traveling line over at least a part of the portion thereof which is in contact with the sprocket, by a distance as much as δl, due to excess accumulation of tight meshing. Unlike the conventional chain, however, the silent chain in the transmission mechanism in accordance with the invention, as shown in FIG. 2(a), does not travel outside the design chain traveling line Lc. Moreover, as illustrated in FIG. 3(b), the chain in the conventional transmission mechanism exhibits meshing failure, or excess meshing interference at locations X. In contrast, as shown in FIG. 3(a), the chain in accordance with the invention is properly seated on the sprocket, without meshing interference.

Unlike a conventional silent chain transmission mechanism, in the transmission mechanism in accordance with the invention, the valve timing chain and the balancer driving chain, can travel regularly, and without dislodging, on the chain traveling line. Remarkably superior noise, vibration, and friction properties, and traveling stability can be achieved.

Although the silent chain transmission mechanism has been described as applied to a valve timing transmission mechanism M1, which effects a speed reduction, and a balancer transmission mechanism M2, which effects a speed increase. However, the invention can be utilized to drive an auxiliary mechanism such an oil pump or the like, with the same effects.

Since the outside dimensions, W and H of the links match the design reference dimensions, Ws and Hs respectively, the links of the silent chain reliably mesh with a sprocket, and disadvantages such as meshing failure, tooth jumping, and the like which occur in the operation of conventional silent chains, can be avoided. Moreover, low noise meshing and low vibration meshing can be realized because the chain travels on the chain traveling line of the sprocket. Furthermore, the silent chain can be easily assembled by arranging randomly gathered link plates in parallel to produce a link row, without the need to match the dimensions of individual link plates with other link plates in a given link row. Thus, the requirement for manufacturing accuracy is reduced, and the effort required for assembly of the silent chain is also reduced, and as a result productivity is significantly improved.

Even in the case of a large sprocket on which a large number of links are in mesh, or a sprocket having a large take-up angle, where involute teeth are produced under the same tooth-cutting conditions, if the outside dimensions, W and H, of the links of the chain match the design reference dimensions, Ws and Hs respectively, in order to achieve meshing of the chain with the sprocket in a regular seated manner, the sprocket reliably and smoothly receives the link rows of the silent chain. Unlike a conventional silent chain mechanism, the silent chain of the invention does not travel outside the original chain traveling line Lc due to excess accumulation of tight meshing. As a result optimum meshing can be attained.

What is claimed is:

1. A silent chain transmission mechanism comprising a silent chain and a sprocket, the silent chain being composed of interleaved link rows connected to one another by connecting pins, each link row being composed of plural, toothed, link plates arranged in side-by-side, parallel, relationship, said link rows having outside meshing surfaces, said silent chain being in meshing relationship with said sprocket, and the outside meshing surfaces of link rows along a portion of said chain being in seated relationship with teeth on said sprocket;

in which, each link plate has a pair of pin-receiving holes for receiving connecting pins, a pair of teeth having straight, converging, outer flanks, a maximum length w, measured in the direction of the length of the chain, and a height h equal to the distance from a pitch line intersecting the centers of said pin-receiving holes to a point at which imaginary extension lines aligned with said outer flanks intersect;

in which, each link row has a length W equal to the maximum length of a lateral projection of said link row, and a height H equal to the distance from a pitch line intersecting the centers of the pin-receiving holes of the link elates of the link row to a point at which imaginary extension lines aligned with the foremost and rearmost flanks of the link plates in said link row intersect;

in which the link plates of each of said link rows are gathered at random, the distances from the centers of the pin-receiving holes to the adjacent flanks of a link elate in each row differ from the corresponding distances in at least one other link plate in the same row, and the distances from the centers of the pin-receiving holes to a midline located midway alone the length of a link plate in each row differ from the corresponding distances in at least one other link plate in the same row, whereby the length W and height H of each link row exceed the length w and height h, respectively, of each of the individual link plates in the same link row;

in which the teeth of said sprocket are shaped to mesh in seated relationship with link plates having a design reference length Ws, and a design reference height Hs; and in which the length W and the height H of each link row respectively match said design reference length Ws and design reference height Hs of the sprocket teeth for proper meshing of said chain with said sprocket;

whereby, the chain can properly mesh with the sprocket even when the link plates in each link row are not matched with one another, and even if the link plates in each link row are asymmetric with respect to a center line extending along the longitudinal direction of the chain.

* * * * *